United States Patent [19]

Rappleyea

[11] 4,014,048
[45] Mar. 29, 1977

[54] INFLATION DEVICE

[75] Inventor: Frederick A. Rappleyea, Park Ridge, Ill.

[73] Assignee: The Kendall Company, Boston, Mass.

[22] Filed: Nov. 24, 1975

[21] Appl. No.: 634,579

[52] U.S. Cl. .................................. 2/413; 137/223; 141/329

[51] Int. Cl.² .......................................... A42B 3/02

[58] Field of Search ...................... 137/223; 46/9 D; 273/65 D; 128/349 BV; 220/DIG. 19; 5/348, 348 WD, 349, 350; 141/19, 329, 330; 2/DIG. 3, 3 R, 413

[56] References Cited

UNITED STATES PATENTS 3,100,498 8/1963 Gibson .............................. 137/223
3,600,714 8/1971 Cade et al. ............................ 2/3 R Primary Examiner—Houston S. Bell, Jr.
Attorney, Agent, or Firm—Powell L. Sprunger

[57] ABSTRACT

An inflation device comprising, an inflatable member having a fluid receiving cavity and an opening extending through the member to the cavity. The device has a fluid lock element secured to the inflatable member in the opening, with the lock element having flexible wall means defining a chamber, first opening means extending from the chamber toward the outside of the lock element, and second opening means spaced from the first opening means and extending from the chamber toward the cavity. The first and second opening means are normally closed to prevent passage of fluid therethrough, with the first opening means being openable to permit passage of the tip of an inflation needle from the outside of the lock element to the chamber, and with the second opening means being openable and positioned to permit passage of the tip of the inflation needle or fluid from the chamber to the cavity.

20 Claims, 8 Drawing Figures

INFLATION DEVICE

BACKGROUND OF THE INVENTION

The present invention relates to inflatable devices, and more particularly to inflation elements for use during inflation of the devices.

In the past, valves have been utilized to facilitate inflation of an assortment of inflatable devices, such as toys and ball, with an inflation needle. Such valves have often been made in the form of a small plug in the device having an opening to receive a tip of the needle. Although such valves may be suitable for many of the inflatable devices, where an accurate final pressure in the device is not required, it has been found that the valves permit leakage of air as the needle is being withdrawn from the valves upon completion of the inflation procedure. Accordingly, such valves are not totally satisfactory when it is desirable to obtain an accurate final pressure in the inflatable devices, since such valves permit a loss of pressure as the needle is being withdrawn from the valves.

SUMMARY OF THE INVENTION

A principal feature of the present invention is the provision of an inflation element of simplified construction which permits accurate determination of the final pressure in an inflatable device during inflation of the device.

The inflation element of the present invention comprises a fluid lock member secured to the inflatable device such that it may communicate with a cavity in the inflatable device. The lock member has flexible wall means defining a chamber, first opening means extending from the chamber toward the outside of the lock member, and second opening means spaced from the first opening means and extending from the chamber toward the cavity. The first and second opening means are normally closed to prevent passage of fluid therethrough, with the first opening means being openable to permit passage of the tip of a inflatiion needle from the outside of the lock member to the chamber, and with the second opening means being openable and positioned to permit passage of the tip of the inflation needle from the chamber to the cavity.

A feature of the invention is that the tip of the inflation needle may be passed through the first and second opening means to the cavity in order to inflate the inflatable device.

Another feature of the invention is that when the tip of the inflation needle is withdrawn from the second opening means, the second opening means closes to prevent passage of fluid from the cavity into the chamber.

Yet another feature of the invention is that when the tip of the needle is withdrawn from the first opening means, the first opening means closes to prevent passage of fluid from the chamber to the outside of the lock member.

Still another feature of the invention is that once the tip of the needle is located in the chamber during withdrawal of the needle from the lock member, the closed second opening means prevents passage of fluid from the cavity through the first opening means as the needle is withdrawn through the first opening means.

Thus, a feature of the present invention is that the first and second opening means cooperate with the chamber to limit the amount of air permitted to escape through the lock member as the needle is withdrawn from the first opening means after inflation of the inflation device.

Another feature of the present invention is that the lock member thus permits an accurate determination of the final pressure obtained in the inflatable device during inflation.

A further feature of the invention is that the needle tip may be positioned in the chamber to inflate the cavity through the second opening means.

Further features will become more fully apparent in the following description of the embodiments of this invention and from the appended claims.

DESCRIPTION OF THE PREFERRED EMBODIMENTS

Figure 1:
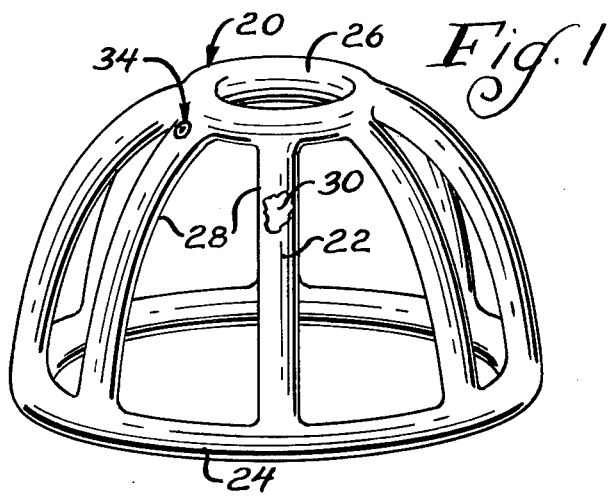
FIG. 1 is a perspective view of an inflatable liner, partly broken away, for a protective head gear having an inflation element according to the present invention.

Referring now to FIG. 1, there is shown an inflatable liner generally designated 20 having a flexible wall 22 defining a lower annular hollow rim 24, an upper hollow annular member 26, and a plurality of hollow spoke members 28 communicating with the lower rim 24 and upper member 26 through an air or fluid cavity 30. The liner 20 may be positioned within a shell (not shown) of a protective headgear, and is utilized to cushion blows delivered against the headgear and to size the shell to a wearer's head. Accordingly, it is desirable to attain relatively accurate inflation pressures in the liner in order to properly size the liner to the wearer's head and thus properly cushion the blows.

Figure 3A:
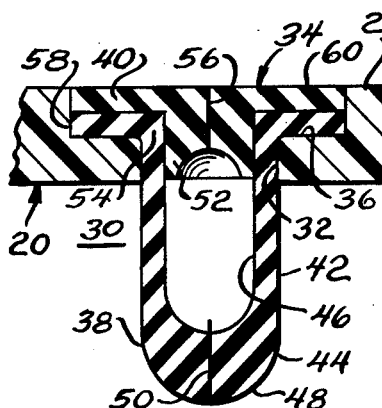
FIGS. 3a and 3b are sectional views of the inflation element of FIG. 2 as attached to the liner.
Figure 3B:
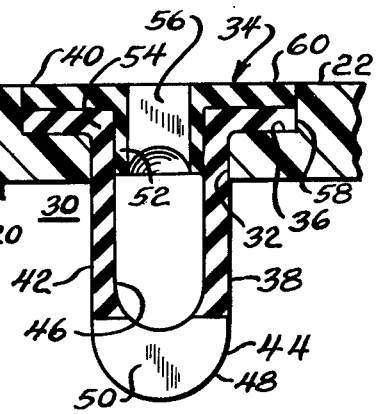

As shown in FIGS. 1, 3a and 3b, the wall 22 of the liner 20 has an opening 32 extending through the wall 22 between the outside of the wall and the cavity 30 to receive an inflation or valve element generally designated 34. As shown, the wall 22 of the liner 20 may have a cutout 36 in the outer portion of the opening 32 to receive flanges of the inflation element 34, such that the inflation element 34 forms a continous outer surface with the wall 22 of the liner 20. Although the inflation element 34 of the present invention will be described primarily for use with the inflatable liner 20, it will be understood that the inflation element may be utilized with any suitable inflatable device, particularly where it is desirable to obtain relatively accurated pressures in the inflatable device after the inflation procedure has been completed.

Figure 2:
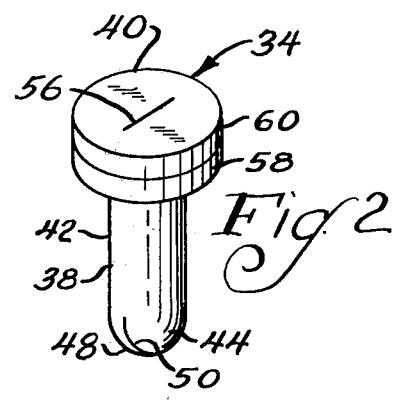
FIG. 2 is a perspective view of an inflation element of the present invention.

Referring to FIGS. 2, 3a, and 3b, the inflation element 34 has a first lock member or tubular nipple 38 of flexible material, and a second lock or plug member 40 secured to the first lock member 38 by suitable means, such as adhesive. The first and second lock or valve members 38 and 40 may be made of a suitable elastomeric material, such as a soft rubber. The first lock member 38 has an elongated tubular section 42 surrounding a chamber 46. The first lock member 38 also has a wall portion 44 extending from the section 42 adjacent an inner end 48 of the first lock member 38 and defining an inner end of the chamber 46. The wall portion 44 has a first slit or aperture means 50 extending the width of the wall portion 44, as shown, and extending between the chamber 46 and the fluid cavity 30. The resiliency of the first lock member 38 normally maintains the slit 50 in a closed sealing relationship, such that the closed slit 50 prevents passage of fluid between the cavity 30 and the chamber 46. Also, as will be described below, the slit 50 is openable to permit passage of the tip of an inflation needle or air from the chamber 46 to the cavity 30.

The second lock member 40 has a plug portion 52 snugly received in an outer end 54 of the tubular section 42 and defining an outer end of the chamber 46. As shown, the second lock member 40 also has a second slit or aperture means 56 extending from the chamber 46 to the outside of the second lock member 40. The resiliency of the second lock member 40 normally maintains the slit 56 in a closed sealing relationship in order to prevent passage of fluid between the chamber 46 and the outside of the inflation element 34. As will be discussed below, the slit 56 is openable to permit passage of the needle tip from the outside of the inflation element 34 into the chamber 46. The slits 50 and 56 of the lock members 38 and 40, respectively, may be aligned to permit smooth passage of the needle through the inflation element.

The first lock member 38 has a radial flange 58 extending peripherally around the secion 42 adjacent the outer end 54. The second lock member 40 also has a radial flange 60 extending peripherally around the plug portion 52, such that the flange 60 mates with the flange 58 of the first lock member 38. As shown, when the plug portion 52 of the second lock member 40 is received in the tubular section 42 of the first lock member 38 and with the flanges 58 and 60 of the lock members in their mating relationship, the inflation element 34 may be secured to the wall 22 of the liner 20 with the flanges 58 and 60 received in the cutout 36 of the wall 22, thus defining a continuous outer surface for the liner 20, while the inner end 48 of the first lock member 38 projects into the cavity 30 of the liner 20.

Figure 5:
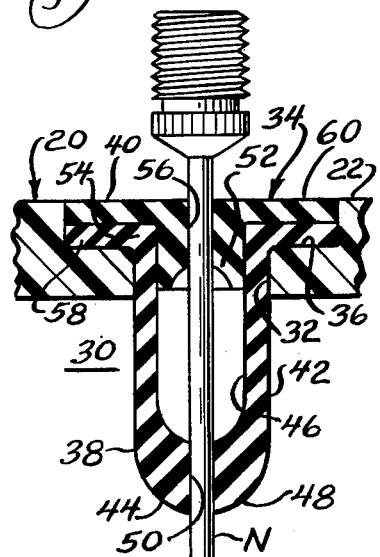
FIG. 5 is a sectional view of the inflation element of FIG. 2 showing an inflation needle passed through the inflation element for inflation of the liner.
Figure 6:
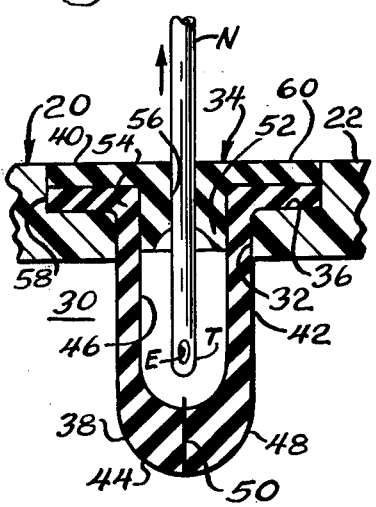
FIG. 6 is a sectional view of the valve of FIG. 5 showing the inflation needle partially removed from the inflation element.

Referring to FIG. 5, when it is desired to inflate the liner 20, the tip T of the inflation needle N may be passed through the slit 56, the chamber 46, and the slit 50 of the inflation element and into the cavity 30 of the liner 20. After the liner 20 has been inflated through an eye E of the needle N to a desired pressure, the needle N may be removed from the inflation element 34. As the needle tip T is withdrawn through the slit 50 into the chamber 46, as shown in FIG. 6, the slit 50 closes and prevents passage of fluid from the cavity 30 into the chamber 46. In this configuration of the needle N, the slit 56 may permit slight leakage of air from the chamber 46 while the needle N is fully withdrawn from the inflation element 34. However, the amount of leakage permitted to escape from the chamber at this time is limited by the size of the chamber, since the slit 50 of the first lock member 38 has already closed. Thus, as the needle is withdrawn from the inflation element 34 after the inflation procedure has been completed, the slits 50 and 56 cooperate with the chamber 46 to limit the amount of air which is permitted to escape from the cavity 30 while the needle is being removed from the inflation element 34. In this manner, the inflation element 34 permits inflation of the liner to a relatively accurate final inflation pressure. According to an alternative inflation procedure, the needle tip T may be positioned in the chamber 46, and the cavity 30 may be inflated through the first slit 50, such that the first lock member 38 acts as a flap valve to permit passage of air from the chamber 46 to the cavity 30, while closing after inflation has been completed to limit escape of air when the needle is withdrawn through the second slit 56.

Figure 4:
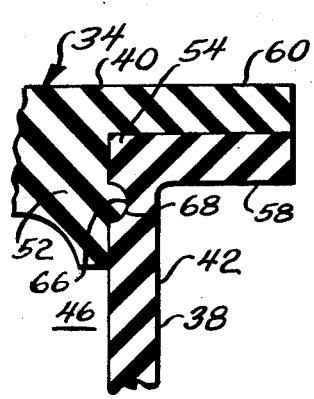
FIG. 4 is a fragmentary sectional view of another embodiment of the inflation element.

Another embodiment of the inflation element 34 of the present invention is illustrated in FIG. 4, in which like reference numerals designate like parts. In this embodiment, the tubular section 42 of the first lock member 38 has an annular groove 66 extending peripherally around the inside of the tubular section 42. Also, the plug portion 52 of the second lock member 40 has an outwardly directed rib 68 extending peripherally around the plug portion 52 and being receivable in the groove 66. Thus, the rib 68 and groove 66 of the lock members 40 and 38, respectively, cooperate to releasably attach the lock members together.

Figure 7:
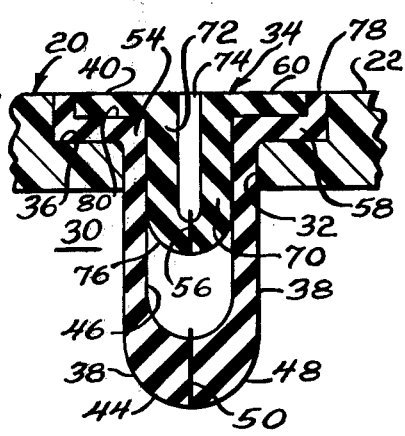
FIG. 7 is a sectional view of another embodiment of the inflation element of the present invention.

Another embodiment of the inflation element 34 of the present invention is illustrated in FIG. 7, in which like reference numerals designate like parts. In this embodiment, the second lock member 40 has a tubular nipple 70 snugly received in the outer end 54 of the tubular section 42. The nipple 70 has a tubular segment 72 defining a channel 74 to receive the tip of the needle, and a wall portion 76 extending from an inner end of the segment 72 ans having the slit 56 extending across the wall portion 76 between the channel 74 and the chamber 46. Thus, the channel 74 of the second lock member 40 guides the tip of the needle as it passes through the slit 56 of the second lock member 40 into the chamber 46 and then through the slit 50 to the cavity 30 of the liner 20. As before, the slit 56 is normally closed in a sealing relationship to prevent passage of fluid from the chamber 46 to the outside of the inflation element 34, and the slits 50 and 56 cooperate with the lock chamber 46 to limit the amount of fluid leakage from the cavity 30 after inflation of the liner 20. As shown, the flange 58 of the first lock member 38 may have an outer rim 78 extending peripherally around the flange 58 and defining a recess 80 with the flange 58 to receive the flange 60 of the second lock member 40.

The foregoing detailed description is given for clearness of understanding only, and no unnecessary limitations should be understood therefrom, as modifications will be obvious to those skilled in the art.

I claim:

1. A cushion device for a protective headgear, comprising:
   an inflatable liner having a wall at least partially defining a cavity, and an opening extending through said wall;
   a fluid lock member secured to said liner wall in the opening, said lock member having an elongated wall section defining a chamber, a flexible outer wall defining an outer portion of the chamber and having a first preformed slit extending between said chamber and the outside of the outer wall, said slit being normally closed to prevent passage of fluid therethrough and being openable a sufficient distance to permit passage of a blunt tip of an inflation needle through said outer wall into the chamber, and said valve member having a flexible inner wall defining an inner portion of the chamber and having a second preformed slit spaced from and generally aligned with the first slit and extending from said chamber to the cavity, with said second slit being normally closed to prevent passage of fluid therethrough and being openable a sufficient distance to permit passage of the blunt tip of the inflation needle or fluid from the chamber to said cavity.

2. An inflation element for an inflatable device having a fluid receiving cavity, comprising:
   a first lock member of flexible material having an elongated hollow section surrounding a chamber and a wall portion extending across an inner end of said section and defining an inner end of said chamber, said wall portion having first preformed aperture means extending through said wall portion between said chamber to the cavity, with said first aperture means being normally closed to prevent passage of fluid therethrough and being openable a sufficient distance to permit passage of a blunt tip of an inflation needle or fluid from said chamber to the cavity; and
   a second lock member of flexible material having a wall extending across said section of the first lock member and defining an outer end of said chamber, said wall having second preformed aperture means extending through the wall between said chamber and the outside of the wall, said second aperture means being normally closed to prevent passage of fluid therethrough and being openable a sufficient distance to permit passage of the blunt tip of the inflation needle from the outside of the wall into said chamber.

3. The inflation element of claim 2 wherein said first and second aperture means are generally aligned.

4. The inflation element of claim 2 wherein said section of the first lock member has a tubular shape.

5. The inflation element of claim 2 wherein said wall portion is rounded.

6. The inflation element of claim 2 wherein said first aperture means comprises a slit.

7. The inflation element of claim 6 wherein said slit extends the width of said wall portion.

8. The inflation element of claim 2 wherein said wall of the second lock member includes a plug portion snugly received in said section of the first lock member.

9. The inflation element of claim 2 wherein said second aperture means comprises a slit.

10. The inflation element of claim 2 wherein said wall of the second lock member includes a hollow segment received in said section of the first lock member defining a channel to receive the inflation needle, and includes a wall portion defining an inner end of said channel, with said second aperture means extending through said wall portion of the second lock member.

11. The inflation element of claim 10 wherein said segment of the second lock member is snugly received in said section of the first lock member.

12. The inflation element of claim 11 wherein said section of the first lock member has a tubular shape, said second aperture means comprises a slit, and said slit extends across the width of said wall portion of the second lock member.

13. The inflation element of claim 2 wherein said second lock member is secured to the first lock member.

14. The inflation element of claim 2 including means for releasably securing the second lock member to the first lock member.

15. The inflation element of claim 14 wherein the wall of said second lock member includes an inner plug portion snugly received in said section of the first lock member, and in which the securing means comprises a rib and groove cooperating between the first and second lock members to releasably retain the lock members together.

16. The inflation element of claim 2 wherein said first lock member has a first flange extending at least partially around the periphery of the first lock member adjacent and outer end of said section, and the second lock member has a second flange mating against the first flange of the first lock member.

17. The inflation element of claim 16 wherein the first flange of said first lock member includes a rim extending peripherally around said first flange and defining with said first flange a recess to receive said second flange of the second lock member.

18. An inflation element for an inflatable device having a fluid receiving cavity, comprising:
   a tubular nipple of flexible material defining a chamber and having a preformed slit extending through an inner end of the nipple between said chamber and the cavity, said slit being normally closed to prevent passage of fluid therethrough and being openable a sufficient distance to permit passage of a blunt tip of an inflation needle or fluid from said chamber to the cavity; and
   a plug member of flexible material secured to an outer end of said nipple and defining an outer end of said chamber, said plug member having a preformed slit extending between said chamber and the outside of the plug member, said slit being normally closed to prevent passage of fluid therethrough, and being openable a sufficient distance to permit passage of the blunt tip of th inflation needle from the outside of the plug member into the chamber.

19. The inflation element of claim 18 wherein said plug member comprises a second tubular nipple snugly received in an outer end of said chamber and defining a channel to receive the tip of the inflation needle, said slit extending across an inner end of said second tubular nipple.

20. The inflation element of claim 18 wherein said nipple and plug member include mating radial flanges adjacent an outer end of the inflation element.

* * * * *